US012534692B2

(12) United States Patent
Keningley et al.

(10) Patent No.: US 12,534,692 B2
(45) Date of Patent: Jan. 27, 2026

(54) LAUNDRY COMPOSITION

(71) Applicant: Conopco, Inc., Englewood Cliffs, NJ (US)

(72) Inventors: Stephen Thomas Keningley, Ynys Mon (GB); Andrew Peter Rose, Wirral (GB)

(73) Assignee: Conopco, Inc., Englewood Cliffs, NJ (US)

( * ) Notice: Subject to any disclaimer, the term of this patent is extended or adjusted under 35 U.S.C. 154(b) by 264 days.

(21) Appl. No.: 17/802,209

(22) PCT Filed: Feb. 25, 2021

(86) PCT No.: PCT/EP2021/054757

§ 371 (c)(1),
(2) Date: Aug. 25, 2022

(87) PCT Pub. No.: WO2021/170759

PCT Pub. Date: Sep. 2, 2021

(65) Prior Publication Data

US 2023/0148247 A1 May 11, 2023

(30) Foreign Application Priority Data

Feb. 27, 2020 (EP) .................................... 20159738

(51) Int. Cl.

| | |
|---|---|
| ***C11D 17/06*** | (2006.01) |
| ***C11D 3/22*** | (2006.01) |
| ***C11D 3/37*** | (2006.01) |
| ***C11D 3/50*** | (2006.01) |
| ***C11D 11/00*** | (2006.01) |

(52) U.S. Cl.

CPC .............. *C11D 3/505* (2013.01); *C11D 3/222* (2013.01); *C11D 3/3707* (2013.01); *C11D 11/0082* (2013.01); *C11D 17/06* (2013.01); *C11D 2111/12* (2024.01)

(58) Field of Classification Search

None

See application file for complete search history.

(56) References Cited

U.S. PATENT DOCUMENTS

| | | | | |
|---|---|---|---|---|
| 4,169,064 A * | 9/1979 | Sagel | ..................... | C11D 3/222 510/474 |
| 7,871,976 B1 * | 1/2011 | Aouad | ............... | C11D 17/0039 512/2 |
| 9,347,022 B1 | 5/2016 | Frentzel et al. | | |
| 2011/0097369 A1 | 4/2011 | Sunder et al. | | |
| 2016/0045435 A1 | 2/2016 | Green | | |
| 2016/0175470 A1 | 6/2016 | Frentzel et al. | | |
| 2018/0105767 A1 | 4/2018 | Lynch et al. | | |
| 2020/0010781 A1 * | 1/2020 | Shen | .................... | C11D 3/3707 |

FOREIGN PATENT DOCUMENTS

| | | | |
|---|---|---|---|
| CN | 105228599 A | 1/2016 | |
| CN | 107106715 A | 8/2017 | |
| CN | 109715776 A | 5/2019 | |
| EP | 2605785 A1 | 6/2013 | |
| EP | 2605785 B1 | 6/2014 | |
| WO | WO-2010039575 A1 * | 4/2010 | ......... C11D 17/0034 |
| WO | 2011056938 A1 | 5/2011 | |
| WO | 2012076068 A1 | 6/2012 | |
| WO | 2016099852 A1 | 6/2016 | |
| WO | 2016100305 A1 | 6/2016 | |
| WO | 2019025244 A1 | 2/2019 | |
| WO | WO-2019025216 A1 * | 2/2019 | ............. C11D 1/008 |

OTHER PUBLICATIONS

European Search Report in corresponding European Patent Application No. 20159738 dated Aug. 17, 2020 (7 pages).
International Search Report and Written Opinion in corresponding International PCT Application No. PCT/EP2021/054757 dated May 28, 2021, (12 pages).

* cited by examiner

*Primary Examiner* — Lorna M Douyon
(74) *Attorney, Agent, or Firm* — Carter, DeLuca & Farrell, LLP; George Likourezos; Bret P. Shapiro

(57) ABSTRACT

A composition comprising a plurality of particles and methods for producing the plurality of particles. The particles comprise: 30 to 95 wt. % polyethylene glycol and the polyethylene glycol has a weight average molecular weight from 4000 to 12000. The plurality of particles further includes 0.1 to 60 wt. % of a secondary carrier. The secondary carrier is provided in the form of particles having a volume average particle size of 35 to 75 μm. The plurality of particles also includes 0.1 to 30 wt. % perfume materials.

13 Claims, No Drawings

LAUNDRY COMPOSITION

FIELD OF THE INVENTION

The present invention is in the field of perfume particles for laundry.

BACKGROUND OF THE INVENTION

Fragrance is an important aspect of the laundry process. Consumers often associate fragrance with cleanliness or simply enjoy the smell; accordingly many laundry products comprise perfumes. However, the desired quantity of perfume varies from consumer to consumer. Consequently perfume particles have been developed to allow consumers to tailor their perfume experience based on their person preferences.

There are various prior art disclosures in the field of perfume particles including:

WO 2011/056938 discloses a composition consisting essentially of: (a) from about 80 percent to about 91 percent by weight of the composition of polyethylene glycol, wherein the polyethylene glycol has a molecular weight from about 5,000 to about 11,000; (b) from about 2 percent to about 12 percent by weight of the composition free perfume; and (c) from about 2 percent to about 12 percent by weight of the composition of friable perfume microcapsule, wherein the perfume microcapsule comprises encapsulated perfume; wherein the composition is shaped in a pastille having a mass from about 0.95 mg to about 2 g.

WO 2016/099852 discloses a composition of a plurality of homogeneously structured particles. The particles include polyethylene glycol, perfume, and starch granules and each has a mass between about 0.95 mg and about 5 grams.

However there remains a need to improve the such particles. In particular there is a need for particles which have improved processing characteristics which result in consumer acceptable particles.

SUMMARY OF THE INVENTION

In a first aspect of the present invention is a composition comprising a plurality of particles, wherein said particles comprise:

a. 30 to 95 wt. % polyethylene glycol, wherein the polyethylene glycol has a weight average molecular weight from 4000 to 12000;
b. to 60 wt. % secondary carrier, wherein the secondary carrier is provided in the form of particles, the particles having a volume average particle size of 35 to 75 μm; and
c. to 30 wt. % perfume materials.

In a second aspect of the present invention is a method of forming particles, wherein polyethylene glycol is melted and a secondary carrier in the form of particles having a volume average particle size of 35 to 75 μm are dispersed therein, the melt is then formed into particles.

In a third aspect of the present invention is a use of the compositions described herein to impart fragrance to laundered fabrics.

It has surprisingly been found that the use of the secondary carrier particle with the specific particle size range, provides a suitable processing viscosity, with sufficient structuring to provide formation of superior particles. Additionally, the particular secondary carrier particle size as described herein will not sediment in the product.

DETAILED DESCRIPTION OF THE INVENTION

These and other aspects, features and advantages will become apparent to those of ordinary skill in the art from a reading of the following detailed description and the appended claims. For the avoidance of doubt, any feature of one aspect of the present invention may be utilised in any other aspect of the invention. The word "comprising" is intended to mean "including" but not necessarily "consisting of" or "composed of." In other words, the listed steps or options need not be exhaustive. It is noted that the examples given in the description below are intended to clarify the invention and are not intended to limit the invention to those examples per se. Similarly, all percentages are weight/weight percentages unless otherwise indicated. Except in the operating and comparative examples, or where otherwise explicitly indicated, all numbers in this description indicating amounts of material or conditions of reaction, physical properties of materials and/or use are to be understood as modified by the word "about". Numerical ranges expressed in the format "from x to y" are understood to include x and y. When for a specific feature multiple preferred ranges are described in the format "from x to y", it is understood that all ranges combining the different endpoints are also contemplated.

Polyethylene Glycol

The particles of the present invention comprise Polyethylene Glycol (PEG). Polyethylene glycol comes in various weight average molecular weights. A suitable weight average molecular weight of PEG for the purposes of the present invention includes from 4,000 to 12,000, preferably 5,000 to 11,000, more preferably 6,000 to 10,000 and most preferably 7,000 to 9,000. Non-limiting examples of suitable PEG is are: Polyglycol 8000 ex Clariant and Pluriol 8000 ex BASF.

The particles of the present invention comprise more than 30 wt. % PEG, preferably more than 40 wt. % PEG, more preferably more than 50 wt. % PEG and most preferably more than 60 wt. % PEG. The particles of the present invention comprise less than 95 wt. % PEG, preferably less than 85 wt. % PEG, more preferably less than 75 wt. % PEG and most preferably less than 70 wt. % PEG. Suitably the particles comprise 30 to 95 wt. % PEG, preferably 40 to 85 wt. % PEG, more preferably 50 to 75 wt. %.

The polyethylene glycol is considered the primary carrier material.

Secondary Carrier

The laundry particles of the present invention comprise a secondary carrier material. The secondary carrier material is present in addition to the polyethylene glycol which is considered the primary carrier material. The secondary carrier material may provide various benefits such as stability benefits. The secondary carrier material is provided in the form of a particle. The particle has a particle size of 35 to 75 μm, preferably 40 to 70 μm, 40 to 60 μm. The particle size is the average (mode) particle size by volume. This may be measured by laser diffraction in a particle size analyser unit with dry powder dispersion capability. For example by using the RODOS dry dispersion series ex. Sympatec or the Mastersizer 3000 ex. Malvern. The correct particle size may be achieved by dry milling of a suitable material. The secondary carrier material particle size refers to the particle size when added into the manufacturing process. Particles having this average particle size provide the correct viscosity for processing while not being too big that they impair the structuring or sediment within the laundry particle.

The laundry particles of the present invention comprise more than 0.1 wt. % secondary carrier, preferably more than 10 wt. % secondary carrier, most preferably more than 20 wt. % secondary carrier. The laundry particles of the present invention comprise less than 60 wt. % secondary carrier, preferably less than 50 wt. % secondary carrier and most preferably less than 40 wt. % secondary carrier. Suitably the laundry particles of the present invention comprise 0.1 to 60 wt. % secondary carrier, preferably 10 to 50 wt. % secondary carrier and most preferably 20 to 40 wt. % secondary carrier.

The secondary carrier materials may be selected from the group consisting of: polymers (e g, polyethylene glycol, ethylene oxide/propylene oxide block copolymers, polyvinyl alcohol, polyvinyl acetate, and derivatives thereof), proteins (e.g., gelatin, albumin, casein), saccharides (e.g. dextrose, fructose, galactose, glucose, isoglucose, sucrose), polysaccharides (e.g., starch, xanthan gum, cellulose, or derivatives thereof), water-soluble or water dispersible fillers (eg., sodium chloride, sodium sulfate, sodium carbonate/bicarbonate, zeolite, silica, clay), and combinations thereof.

Examples of suitable secondary carrier materials include: water soluble organic alkali metal salt, water soluble inorganic alkaline earth metal salt, water soluble organic alkaline earth metal salt, water soluble carbohydrate, water soluble silicate, water soluble urea, starch, xanthan gum, dextrose, clay, water insoluble silicate, citric acid carboxymethyl cellulose, fatty acid, fatty alcohol, glyceryl diester of hydrogenated tallow, glycerol, polyvinyl alcohol and combinations thereof.

Preferred secondary carrier materials may be selected from the group consisting of polysaccharides (e.g., starch, xanthan gum, cellulose, or derivatives thereof), saccharides (e.g, dextrose, fructose, galactose, glucose, isoglucose, sucrose) and water soluble or water dispersible fillers such (eg., sodium chloride, sodium sulfate, sodium carbonate/bicarbonate, zeolite, silica, clay), and combinations thereof.

More preferably the secondary carrier is selected from saccharides and polysaccharides, most preferably the secondary carrier is selected from saccharides.

Suitable polysaccharides may be selected from starch, glycogen, glucose, chitin, gum arabic and xanthan gum.

Saccharides are molecular compounds comprising carbon, hydrogen and oxygen. For the purposes of this invention a saccharide is defined as comprising one to ten monosaccharide units and mixtures thereof. In other words either a monosaccharide or an oligosaccharide or mixtures thereof. An oligosaccharide is a short saccharide polymer, typically considered in the art to comprise between two and ten monosaccharides units. It is preferred that a saccharide comprises 1 to 5 monosaccharide units, more preferably 1 to 4 monosaccharide units, most preferably the saccharide comprises monosaccharides, disaccharides or mixtures thereof. Disaccharides are the product of a reaction between two monosaccharides. They may be formed from two identical monosaccharides or two different monosaccharides. Examples of disaccharides include: sucrose, maltose, lactose. Monosaccharides are simple sugar units having the general formula $(CH_2O)_n$. Commonly n is 3, 5 or 6. According, monosaccharides can be classified by the number n, for example: trioses (e.g. glyceraldehyde), pentoses (e.g. ribose) and hexoses (e.g. fructose, glucose and galactose). Some monosaccharides may be substituted with additional functional groups, e.g. Glucosamine, others may have undergone deoxygenation and lost an oxygen atom e.g. deoxyribose. Therefore, the general chemical formulae can vary slightly depending on the monosaccharide.

Preferred monosaccharides for the present invention are hexose molecules (n=6). Hexose molecules all have the same molecular formula, however, have a different structural formula, i.e. are structural isomers. It is preferred that the hexose comprises a 6-membered ring, opposed to a 5 membered ring. Glucose and galactose have 6-membered rings. In a preferred embodiment the hexose monosaccharide is glucose. Glucose is a chiral molecule, having a mixture of D and L stereo isomers. Particularly preferably, the glucose of the present invention is the D isomer of glucose, also known as dextrose.

Preferably a saccharide material used in the present invention is anhydrous, i.e. free of any water. For example, dextrose monohydrate contains one molecule of water whereas anhydrous dextrose contains none.

Non-limiting examples of suitable saccharides for the present invention are: C*Dex ex Cargill, Treha ex Cargill, Anhydrous Dextrose ex Foodchem.

When a saccharide is used in the present invention, it may be preferable to include bitter material such as Bitrex ex Johnson Matthey Fine Chemicals, due to the sweetness of the saccharide.

Perfume

The particles of the present invention comprises 0.1 to 30 w.t. % perfume materials, i.e. free perfume and/or perfume microcapsules. As is known in the art, free perfumes and perfume microcapsules provide the consumer with perfume hits at different points during the wash cycle. It is particularly preferred that the particles of the present invention comprise a combination of both free perfume and perfume microcapsules.

Preferably the particles of the present invention comprises 0.5 to 20 w.t. % perfume materials, more preferably 1 to 15 w.t. % perfume materials, most preferably 2 to 10 w.t. % perfume materials.

Useful perfume components may include materials of both natural and synthetic origin. They include single compounds and mixtures. Specific examples of such components may be found in the current literature, e.g., in Fenaroli's Handbook of Flavor Ingredients, 1975, CRC Press; Synthetic Food Adjuncts, 1947 by M. B. Jacobs, edited by Van Nostrand; or Perfume and Flavor Chemicals by S. Arctander 1969, Montclair, N.J. (USA). These substances are well known to the person skilled in the art of perfuming, flavouring, and/or aromatizing consumer products.

Free Perfumes:

The particles of the present invention preferably comprises 0.1 to 15 w.t. % free perfume, more preferably 0.5 to 8 w.t. % free perfume.

Particularly preferred perfume components are blooming perfume components and substantive perfume components. Blooming perfume components are defined by a boiling point less than 250° C. and a Log P or greater than 2.5. Substantive perfume components are defined by a boiling point greater than 250° C. and a Log P greater than 2.5. Boiling point is measured at standard pressure (760 mm Hg). Preferably, a perfume composition will comprise a mixture of blooming and substantive perfume components. The perfume composition may comprise other perfume components.

It is commonplace for a plurality of perfume components to be present in a free oil perfume composition. In the compositions for use in the present invention it is envisaged that there will be three or more, preferably four or more, more preferably five or more, most preferably six or more different perfume components. An upper limit of 300 perfume components may be applied.

Perfume Microcapsules:

The particles of the present invention preferably comprises 0.1 to 15 w.t. % perfume microcapsules, more preferably 0.5 to 8 w.t. % perfume microcapsules. The weight of microcapsules is of the material as supplied.

When perfume components are encapsulated, suitable encapsulating materials, may comprise, but are not limited to; aminoplasts, proteins, polyurethanes, polyacrylates, polymethacrylates, polysaccharides, polyamides, polyolefins, gums, silicones, lipids, modified cellulose, polyphosphate, polystyrene, polyesters or combinations thereof. Particularly preferred materials are aminoplast microcapsules, such as melamine formaldehyde or urea formaldehyde microcapsules.

Perfume microcapsules of the present invention can be friable microcapsules and/or moisture activated microcapsules. By friable, it is meant that the perfume microcapsule will rupture when a force is exerted. By moisture activated, it is meant that the perfume is released in the presence of water. The particles of the present invention preferably comprises friable microcapsules. Moisture activated microcapsules may additionally be present. Examples of a microcapsules which can be friable include aminoplast microcapsules.

Perfume components contained in a microcapsule may comprise odiferous materials and/or pro-fragrance materials.

Particularly preferred perfume components contained in a microcapsule are blooming perfume components and substantive perfume components. Blooming perfume components are defined by a boiling point less than 250° C. and a Log P greater than 2.5. Substantive perfume components are defined by a boiling point greater than 250° C. and a Log P greater than 2.5. Boiling point is measured at standard pressure (760 mm Hg). Preferably, a perfume composition will comprise a mixture of blooming and substantive perfume components. The perfume composition may comprise other perfume components.

It is commonplace for a plurality of perfume components to be present in a microcapsule. In the compositions for use in the present invention it is envisaged that there will be three or more, preferably four or more, more preferably five or more, most preferably six or more different perfume components in a microcapsule. An upper limit of 300 perfume components may be applied.

The microcapsules may comprise perfume components and a carrier for the perfume ingredients, such as zeolites or cyclodextrins.

Colourant

The particles of the present invention preferably comprise a colourant. The colourant may be a dye or a pigment or a mixture thereof. The colourant has the purpose to impart colour to the particles, it is not intended to be a shading dye or to impart colour to the laundered fabrics. A single colourant or a mixture of colourants may be used.

Preferably, the colourant is a dye, more preferably a polymeric dye. Non-limiting examples of suitable dyes include the LIQUITINET range of dyes ex Milliken Chemical.

Preferably the particles of the present invention comprise 0.001 to 2 wt. %, more preferably 0.005 to 1 wt. %, most preferably 0.01 to 0.6 wt. %.

Additional Benefit Agents

The particles of the present invention comprise perfume as a primary benefit agent. However, it may be desirable for the particles of the present invention to deliver more than one benefit agent to laundered fabrics. Additional benefit agents may be free in the carrier material i.e. the PEG, or they may be encapsulated. Suitable encapsulating materials are outlined above in relation to perfumes.

a) malodour agents for example: uncomplexed cyclodextrin; odor blockers; reactive aldehydes; flavanoids; zeolites; activated carbon; and mixtures thereof
b) dye transfer inhibitors
c) shading dyes
d) silicone oils, resins, and modifications thereof such as linear and cyclic polydimethylsiloxanes, amino-modified, allcyl, aryl, and alkylaryl silicone oils, which preferably have a viscosity of greater than 50,000 cst;
e) insect repellents
f) organic sunscreen actives, for example, octylmethoxy cinnamate;
g) antimicrobial agents, for example, 2-hydroxy-4, 2,4-trichlorodiphenylether;
h) ester solvents; for example, isopropyl myristate;
i) lipids and lipid like substance, for example, cholesterol;
j) hydrocarbons such as paraffins, petrolatum, and mineral oil
k) fish and vegetable oils;
l) hydrophobic plant extracts;
m) waxes;
n) pigments including inorganic compounds with hydrophobically-modified surface and/or dispersed in an oil or a hydrophobic liquid, and;
o) sugar-esters, such as sucrose polyester (SPE).

Laundry Actives

The particles of the present invention have the purpose of providing fragrance, the primary function is not softening or cleaning. The particles of the present invention are preferably substantially free of laundry and softening actives. By substantially free, it is meant 0 to 3 wt. % of softening or cleaning actives, preferably 0 to 2 wt. %, more preferably 0 to 1 wt. % of the particle composition. Softening and cleaning agents are well known in the art, examples of which include: detergent surfactants, detergent builders, bleaching agents, enzymes, and quaternary ammonium compounds. A low level of non-detersive surfactant may be present in the perfume and/or benefit agent compositions which may be present in the particles of the present invention.

Form of Particles

The particles of the present invention may be in any solid form, for example: powder, pellet, tablet, prill, pastille or extrudate. Preferably the particles are in the form of a pastille. Pastilles can, for example, be produced using ROTOFORM ER Granulation Systems ex. Sandvick Materials.

In one aspect of the present invention is a method of forming particles, wherein polyethylene glycol is melted and a secondary carrier in the form of particles having a volume average particle size of 35 to 75 μm are dispersed therein, the melt is then formed into particles.

Preferably the polyethylene glycol is 30 to 95 wt. % of the final composition and preferably the polyethylene glycol has a weight average molecular weight from 4000 to 12000.

Preferably the secondary carrier is 0.1 to 60 wt. % of the final composition.

Preferably perfume is added to the melted polyethylene glycol either before or after the secondary carrier particles. Preferably after the secondary carrier particles. Preferably 0.1 to 30 wt. % of the final composition.

The polyethylene glycol is suitably melted at a temperature above the melting point of the polyethylene glycol, preferably at least 2° C. above the melting point of the polyethylene glycol, more preferably at least 5° C. above the melting point of the polyethylene glycol. The melting point is the average melting point for the polyethylene glycol used in a particular composition.

The particles of the present invention are formed from a melt. The particles can for example, be formed into particles by: Pastillation e.g. using a ROTOFORMER ex Sandvick Materials, extrusion, prilling, by using moulds, casting the melt and cutting to size or spraying the melt.

The secondary carrier particles as described herein, having an average particle size of 35 to 75 μm aid the processing and formation of the laundry particles. They provides an optimal viscosity at a processing temperatures of between 40 and 70° C. and impart structure in the laundry particles. Particles of 35 to 75 μm are also small enough to not sediment in the final product laundry particles.

The particles of the present invention are preferably homogeneously structured. By homogeneous, it is meant that there is a continuous phase throughout the particle. There is not a core and shell type structure. The secondary carrier particles and other materials such as perfume microcapsules will be distributed within the continuous phase. The continuous phase is provided predominately by the polyethylene glycol.

The particles may be any shape or size suitable for dissolution in the laundry process. Preferably, each individual particle has a mass of between 0.95 mg to 5 grams, more preferably 0.01 to 1 gram and most preferably 0.02 to 0.5 grams. Preferably each individual particle has a maximum linear dimension in any direction of 10 mm, more preferably 1-8 mm and most preferably a maximum linear dimension of 4-6 mm. The shape of the particles may be selected for example from spherical, hemispherical, compressed hemispherical, lentil shaped, oblong, or planar shapes such as petals. A preferred shape for the particles is hemispherical, i.e. a dome shaped wherein the height of the dome is less than the radius of the base. When the particles are compressed hemispherical, it is preferred that diameter of the substantially flat base provides the maximum linear dimension and the height of the particle is 1-5 mm, more preferably 2-3 mm. the dimensions of the particles of the present invention can be measured using Calipers.

Method of Use

The particles of the present invention are for use in the laundry process. They may be added in the wash phase, second phase or a rinse phase of a wash cycle using a washing machine. Alternatively the particles may be used in manual hand washing of fabrics. The particles may be used in addition to other laundry products or they may be used as a standalone product.

The particles of the present invention are preferably dosed in a quantity of 1 g to 50 g, more preferably 10 g to 45 g, most preferably 15 g to 40 g.

Use for the Particles

The primary use of the particles of the present invention is to impart fragrance to laundered fabrics. The fragrance is imparted during the laundry process. The particles may be further used to deliver additional benefit agents to fabrics during the laundry process.

EXAMPLES

Formulations:

| Ingredient | | Inclusion % by weight | | | | |
|---|---|---|---|---|---|---|
| | | A | B | 1 | 2 | 3 |
| PEG 8000 [1] | | 71 | 71 | 71 | 65 | 65 |
| Dextrose[2] | Milled to 17 μm | 29 | | | | |
| | Milled to 40 μm | | | 29 | 26 | |
| | Milled to 80 μm | | 29 | | | |
| Starch[3] - milled to Milled to 60 μm | | | | | | 26 |
| Blue dye[4] | | | | | 0.01 | 0.01 |
| Free perfume | | 2 | 2 | 2 | 7 | 7 |
| Perfume microcapsules[5] | | | | | 2 | 2 |

PEG 8000 [1]—Polyglycol 8000 ex Clariant
Dextrose[2]—Anhydrous dextrose C*Dex ex Cargill
Starch[3]—Tapioca C*Creamgel 7001 ex Cargill
Blue dye[4]—Milliken Liquitint Blue HP
Perfume microcapsules[5]—weight as supplied

EXPERIMENTAL

Example and comparative formulations were prepared as follows:

Dextrose particles were dry milled to an average particle size of 80, 40 and 17 μm. Polyethylene glycol was heated to 60-80° C. and the milled dextrose dispersed therein. Processing viscosity was assessed before the addition of perfume.

| Formulation | Viscosity | Comments |
|---|---|---|
| A | 120 Pa · s @ 0.1 $s^{-1}$<br>4.5 Pa · s @20 $s^{-1}$ | Viscosity too high for processing<br>overpressure occurs |
| 1 | 45 Pa · s @ 0.1 $s^{-1}$<br>3.5 Pa · s @ 20 $s^{-1}$ | Viscosity right for processing |
| B | 13 Pa · s @ 0.1 $s^{-1}$<br>3.5 Pa · s @ 20 $s^{-1}$ | Viscosity too low for processing,<br>separation occurs in the particles |

In conclusion, when the secondary particle size was in the range of 35 to 75 μm a slurry was created at the correct viscosity for processing and improved perfume particles were obtained.

The invention claimed is:

1. A composition comprising a plurality of particles, wherein said particles comprise:

a. 50 to 95 wt. % polyethylene glycol, the polyethylene glycol has a weight average molecular weight from 4,000 to 12,000;

b. 10 to 60 wt. % secondary carrier, the secondary carrier is provided as secondary carrier particles, the secondary carrier particles having a volume average particle size of 35 to 75 μm, and the secondary carrier comprises saccharides, wherein the secondary carrier particle size aids the processing and formation of the particles, provides a viscosity of 45 Pa·s @ 0.1 $s^{-1}$ at processing temperatures of between 40° and 70° C., imparts structure in the particles, and are sized to not sediment in the composition; and c. 0.1 to 30 wt. % perfume materials; wherein said particles are homogeneously structured.

2. The composition according to any claim 1, wherein the composition comprises 0.1 to 15 wt. % perfume materials as free perfume.

3. The composition according to claim 1, wherein the composition comprises 0.1 to 15 wt. % of the particle perfume materials as perfume microcapsules.

4. The composition according to claim 3, wherein the perfume microcapsules comprise friable perfume microcapsules.

5. The composition according to claim 1, wherein the perfume materials comprise both free perfume and perfume microcapsules.

6. The composition according to claim 1, wherein the particles are pastilles.

7. The composition according to claim 1, wherein the particles have a maximum dimension less than 10 mm.

8. The composition according to claim 1, wherein the particles further comprise 0.001 to 2 wt % colourant.

9. The composition according to claim 1, wherein the particles have a continuous phase comprising the polyethylene glycol.

10. A method of forming a composition comprising a plurality of particles according to claim 1 comprising the steps of melting polyethylene glycol and dispersing therein the secondary carrier to produce a melt which is then formed into particles.

11. The method according to claim 10, wherein the melt is formed into particles by pastillation, extrusion, prilling, by using moulds, casting the melt and cutting to size or by spraying the melt.

12. The method of forming particles, according to claim 10, wherein the particles formed are a composition further comprising free perfume, perfume microcapsules or both.

13. The method according to claim 12 wherein the particles formed are a composition further comprising an ester, lipid, sunscreen, silicone, insect repellant, dye, antimicrobial agent or a mixture thereof.

* * * * *